United States Patent Office 3,105,030
Patented Sept. 24, 1963

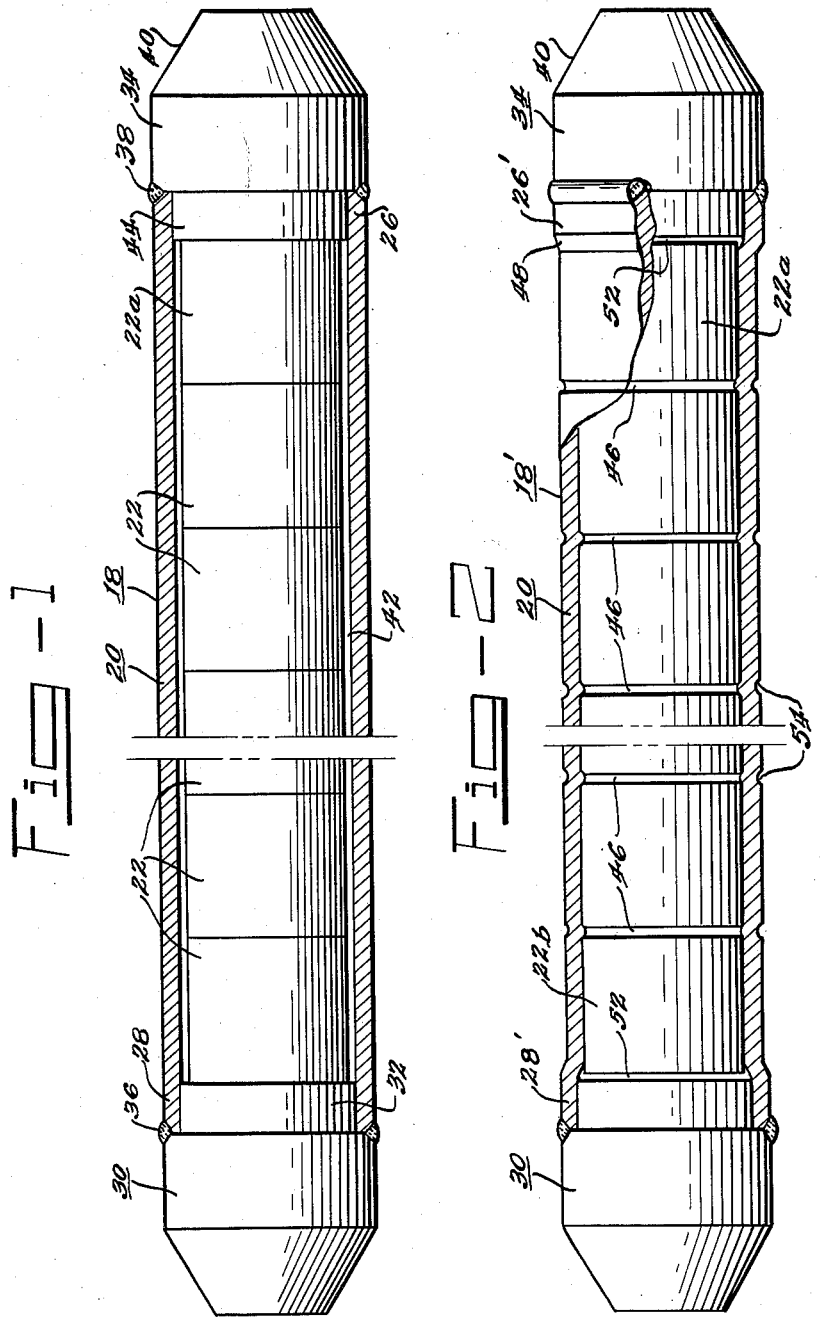

3,105,030
FUEL ELEMENT FOR A NEUTRONIC REACTOR
Robert K. McGeary and Fitz R. Winslow, Pittsburgh, Pa., assignors, by mesne assignments, to the United States of America as represented by the United States Atomic Energy Commission
Original application Mar. 17, 1958, Ser. No. 721,776. Divided and this application Mar. 18, 1959, Ser. No. 800,351
2 Claims. (Cl. 204—193.2)

The present invention relates to a fuel element assembly for neutronic reactors and more particularly to a fuel assembly adapted for use in a pressurized water heterogeneous type reactor. The application is a division of our co-pending application S.N. 721,776, filed March 17, 1958.

The fuel element disclosed herein is adapted for use in a neutronic reactor wherein a quantity of one or more of the fissionable isotopes $U^{233}$, $U^{235}$ and $Pu^{239}$ is caused to undergo a chain reaction. The chain reaction is propagated by neutrons having a specific range of velocities depending upon the type of reactor in which the fissionable material is employed.

In a thermal-type reactor the chain reaction is propagated by neutrons having velocities equivalent to thermally excited hydrogen ions or about 2500 meters per second. A neutronic reactor of this character usually employs the $U^{233}$ or $U^{235}$ isotopes or both of uranium to propagate the reaction. However, during the fissioning of each of these atoms, which, of course, results in two approximately equal fission fragments, an average of approximately three neutrons are expelled. However, most of these neutrons have velocities in the fast region, that is to say in excess of 10,000 meters per second. Therefore, in order to propagate the chain reaction in a thermal reactor, it is necessary to employ a neutron-slowing material, termed a moderator, to slow the fast neutrons to the thermal velocity region. Suitable moderator materials are carbon, hydrogen, and deuterium, or materials containing these elements such as graphite, light water, deuterium oxide or heavy water, and radiation-stable organic materials, such as the multi-phenyls.

The thermal-type reactor may be constructed in the form of a lattice network of uranium or an alloy thereof containing one of the fissionable isotopes and provided with coolant passages for the circulation of a suitable cooling medium such as water or carbon dioxide. Alternatively, the nuclear fuel material can be suspended in spaced relation in a pressurized vessel, and light or heavy water can be utilized both as a cooling medium and as a moderator material, with suitable circulating loops being employed to maintain a flow of the moderator-coolant through the vessel to remove the heat developed by the chain reaction. Suitable heat exchanging means are disposed in the aforementioned circulating loops in order to convert into steam the water supplied to the heat exchanger from one or more secondary or thermodynamic loops.

As stated previously, the aforementioned coolant-moderator, in certain applications, can be either light or heavy water, with light water being the more efficient moderator material due to the lighter weight of the hydrogen nuclei. On the other hand, the use of heavy water is applicable in those cases wherein it is necessary to minimize the parasitic absorption of fissional neutrons within the reactor system as a result of peripheral and structural neutron losses. Heavy water is advantageous in this application in that it has a much smaller neutronic capture cross-section than that of light water.

The peripheral loss of neutrons from the chain reacting system is minimized by providing a neutronic reflector adjacent the periphery of the system or adjacent the inner walls of the containment vessel. This reflector can take the form of a layer of graphite disposed adjacent the inner wall surface of the vessel or of a water chamber or annular space usually reserved for this purpose between the outer periphery of the reactor core structure and the inner wall of the reactor vessel. When light or heavy water is employed as a coolant, this annular space, of course, is filled with the water and thus serves as a neutronic shield or reflector.

Another form of neutronic reactor is typified by the so-called epithermal reactor. In this reactor a quantity of at least one of the aforementioned fissionable isotopes are subjected to a chain reaction maintained by neutrons within the epithermal region, that is to say, neutrons having velocities between 2500 and 10,000 meters per second. In this form of reactor, the nuclear fuel or fissionable material is relatively closely spaced in order to lessen the moderating capacity of the moderator material. This form of reactor is particularly applicable for the fissioning of plutonium 239 which is fissionable most efficiently by neutrons in the higher velocity ranges.

The thermal or epithermal-type reactors are controlled by means of so-called control rods which are insertable through the reactor vessel into the reactor core. These control rods each contain a relatively good neutron-absorbing material, such as boron, hafnium, and gadolinium, and by variably absorbing the neutrons produced by the chain reaction, depending upon the position of the control rods relative to the reactor core, the propagation of the chain reaction to the reactor core, can be carefully controlled.

In any of the aforementioned reactor systems, a fertile or "blanket" material, such as uranium 238 or thorium 232, can be mixed or intermingled with the previously mentioned fissionable materials or otherwise disposed within the reactor vessel at positions adjacent to the fissionable isotope. The fertile materials, when thus used, absorb those neutrons which are not required for the propagation of the chain reaction and in doing so are transmuted into certain ones of the fissionable isotopes. For example, during neutronic radiation, atoms of the fertile material uranium 238 when employed are converted into the fissionable transuranic element plutonium 239 in accordance with the following nuclear equations:

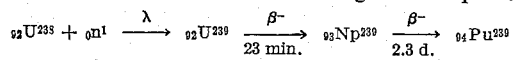

with the times denoted in connection with the latter two reactions being the half-lives of the decaying isotopes. The plutonium 239 isotope is produced in either the thermal reactor wherein the initial core loading consists of natural or source-grade uranium, which may be enriched with one of the aforementioned fissionable isotopes or disposed adjacent to a quantity of the fissionable isotope in the form of a "seed"; or in the so-called fast breeder type reactor wherein the initial core loading consists of natural uranium and a quantity of the plutonium 239 isotope.

On the other hand, the artificial fissionable isotope $U^{233}$ is obtained when thorium 232 is employed as the fertile or blanket material in a thermal or epithermal type reactor. The $U^{233}$ isotope is formed as a result of the following series of nuclear reactions:

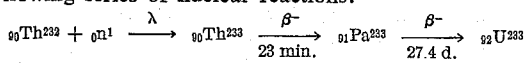

The artificial fissionable isotope $U^{233}$ and the transuranic isotope $Pu^{239}$ have half-lives of 163,000 years and 24,000 years, respectively, and therefore are relatively stable in this respect.

The neutronic reactor reaches criticality when each succeeding generation of fissions of the chain reaction is exactly equal in number to that of the preceding generation. At this point the effective constant of criticality ($K_{eff.}$) is equal to unity and as a result, of the average of three neutrons yielded in each fission, only approximately one of these neutrons is employed to propagate the chain reaction, and the remainder of the neutrons are absorbed by the aforementioned fertile materials, by the moderator and coolant materials and by the structural components of the reactor system.

Control of neutronic reactors is made feasible by the phenomenon of delayed neutrons. It has been found that an average of about 2.8 to 2.9 of the 3.0 fission neutrons are emitted immediately upon fissioning of each chain-reacting atom. The delayed neutrons are emitted up to about 12 minutes after the fission process. Although only about 3 to 7% of the total neutrons emitted as a result of atomic fission are delayed neutrons, the time-margin provided by these delayed neutrons is sufficient to permit adjustment of the control rods to maintain the chain reaction approximately at the point of criticality during operation of the reactor. Otherwise, a tendency to an increase in the number of fissions from one generation to the next in the chain reaction would be multiplied almost instantaneously.

A more detailed description of the theory and operation of neutronic reactors are given in Patent Nos. 2,708,656 and 2,798,847, issued May 17, 1955, and July 9, 1957, to Enrico Fermi and Leo Szilard, and entitled "Neutronic Reactor" and "Method of Operating a Neutronic Reactor," respectively.

In order to protect the fissionable material from the corrosive effects of the high temperature pressurized water utilized in the coolant system for neutronic reactors of the character described herein, it is necessary to encase the fissionable isotope within a suitable corrosion-resistant cladding material. Because of the considerable length of the fuel rods employed within the reactor core, the cladding material and associated structural components have heretofore been made in relatively large sizes or thicknesses in order to suport properly the fuel elements. In many cases, the required mass of structural material increased the importance of utilizing material having a low neutronic absorption cross-section.

The fuel rods employed in the present or proposed pressurized water reactors and similar heterogeneous type reactors frequently are provided with a total length in the neighborhood of eight to ten feet and with an outside diameter of about 0.3 inch. As described more fully hereinafter, these fuel rods comprise an elongated tube of a corrosion-resistant material in the case of water cooled reactors, for example, stainless steel, zirconium, or a zirconium alloy or aluminum alloy. Although stainless steel is preferable insofar as handling and fabricational characteristics are concerned, this material has a relatively higher neutronic absorption cross-section. Accordingly, it is imperative that the tubing or cladding be made as thin as feasible in order to minimize parasitic absorption of neutrons therein.

The aforementioned cladding tubes are then substantially filled with a quantity of one of the aforementioned fissile materials or combinations thereof. For example, this fissible material can be furnished in a form of uranium oxide ($UO_2$) fabricated into relatively short right-cylindrical pellets by compacting a pulverulent form of the oxide followed by sintering and grinding. In grinding the pellets, the outer diameter of the pellets is formed such that the pellets fit relatively closely within the tubing with diametric clearances of the order of 3 to 6 mils. Such clearance is necessary to permit insertion of the pellets within the tube in order to form a column of pellets extending therethrough. Moreover, during operation of the reactor, the pellets being at a higher temperature than the cladding tube, which is in contact with the coolant flowing through the reactor, expand to a greater extent, and therefore the aforesaid clearances permit longitudinal movement of the pellet column relative to the cladding tube. However, these clearances must be large enough that relative radial expansion of the pellets, that is to say in a direction transversely of the tube walls, will not cause binding between one or more of the pellets and the cladding tube.

In known arrangements of reactor fuel rods, however, the aforementioned differential thermal expansion necessitates the provision of a void between the upper end of the column and the upper end of the cladding tube to accommodate the aforesaid relative longitudinal movement of the pellet column. The length of this void is dictated by the length of the pellet column and must be approximately 0.01 inch per inch of pellet column length in order to absorb the aforesaid differential expansion. For those elongated fuel rods mentioned previously, the length of the void therefor is approximately 1 inch. In the area of the void, however, the cladding tube is completely unsupported by the fissile pellets and therefore must have sufficient strength to prevent its collapsing as a result of forces exerted externally and radially by the pressurized reactor coolant.

In a typical pressurized reactor utilized for power purposes, this pressure may reach a value of 2500 pounds per square inch during operation of the reactor and 3750 p.s.i. during preoperational testing. If the length of the void exceeds the diameter of the cladding tube, collapsing will occur in the area of the void unless the cladding tube is made sufficiently strong to withstand this pressure. As a result, the drawing techniques employed in fabricating the cladding tubes necessitates making the entire tube wall thicker than that required merely for supporting of the fuel rod. However, if the continuous unsupported length of the aforesaid void can be reduced, resistance to collapsing increases and it is possible to utilize fuel rods having thinner cladding. The usage of a thinner cladding material is made feasible by the present invention as described hereinafter. As a result, the present invention affords an improvement in neutronic economy of the reactor, thereby permitting the use of less expensive cladding material such as stainless steel.

As stated previously in known types of reactor fuel rods, it is necessary to preserve a certain amount of clearance between the fuel pellets and the cladding tube in order to permit relative movement therebetween. However, usage of such clearances increase the heat transfer coefficient between the fuel pellets and the reactor coolant. As a result, the maximum temperature at which the reactor core can be operated is reduced, since the temperature adjacent the axis of the pellet column is increased. It should be added, however, that the pellet diameter also increases at this time relative to the inside diameter of the cladding tube and thereby reduces to some extent these clearances. However, the clearance is not eliminated all together, and there is no assurance that the relative increases in the pellet diameter will be uniform. Moreover the use of an expensive heat transfer gas, such as helium, within the cladding tube is necessary to attain an acceptable heat transfer characteristic. These disadvantages which are encountered in heretofore known fuel rod arrangements are obviated by the invention which produces a fuel rod in which the cylindrical surfaces of the pellets are maintained in continuous contact with the inner wall of the cladding tube during cyclic operation of the reactor.

Moreover, the resultant relative movement of the fuel pellets relative to the cladding tube of known fuel rod arrangements produces eventually a number of chips and other particles of the fissile oxide, which, during a number of operating cycles of the reactor, may accumulate in the clearances described previously. As a result, the friction associated with relative longitudinal movement between the pellet column and the cladding tube of prior fuel rods increases rapidly during utilization thereof. As may be anticipated, the friction at times reaches a value high enough to cause positive locking or binding between portions of the fuel pellet column and the adjacent inner wall of the cladding tube. Continued expansion of the column then results in a slight stretching of the cladding tube beyond its elastic limit or yield point. During repeated operation of cycles of heating and cooling of the reactor fuel rods, the cumulative result of such inelastic stretching can eventually cause some of the fuel rods to buckle or to rupture with attendant release of highly radioactive fissional products into the primary coolant system. This disadvantage of known types of fuel rods is likewise obviated by the invention which affords means for causing the cladding tube to grip securely each one of the fuel pellets such that each pellet can expand and contract independently of the remaining fuel pellets.

In view of the foregoing, an object of the present invention is to provide a novel and efficient fuel element adapted for use in a neutronic reactor.

Another object of the invention is to furnish a novel and improved method for fabricating a reactor fuel element.

Further objects of the invention are to facilitate passage of coolant flowing between adjacent fuel elements and to minimize the spacing required for adequate coolant flow therebetween.

Still another object of the invention is to provide a fuel element of the character described wherein means are provided for increasing the rate of heat transfer from the fuel material thereof to the outer surface of the fuel element.

Still another object of the invention is to provide a fuel element wherein the clearances between the fuel material and the cladding material are eliminated.

A further object of the invention is to provide a reactor fuel element wherein the fuel material thereof is provided in the form of individual pellets which are gripped independently by the cladding material of the fuel rod.

A still further object of the invention is the provision of a reactor fuel element having means for reducing the required thickness of the cladding material therefor.

These and other objects, features and advantages of the invention will be described more fully hereinafter during the forthcoming description of an illustrative modification of the invention, with the description being taken in conjunction with the accompanying drawings, wherein:

FIGURE 1 is a longitudinally sectioned view of a fuel rod preassembly to which the method of the invention is adaptable; and FIG. 2 is a longitudinally sectioned view of a rod type fuel rod arrangement in accordance with the invention.

The fuel element disclosed and claimed herein is adapted for incorporation in a fuel element assembly such as that shown and described in copending applications of Erling Frisch, entitled "Fuel Element Assembly for a Nuclear Reactor," Serial No. 635,911, now abandoned, and "Neutronic Reactor Fuel Element," Serial No. 721,775, filed January 23, 1957, and March 17, 1958, respectively, with both of these applications being assigned to the present assignee. Thus, a plurality of the fuel rods disclosed herein are adapted for joining laterally to one another and at their ends to a pair of flow nozzles or end pieces, respectively, as described in the aforementioned copending applications.

The fuel element disclosed and claimed herein is adapted also for use for a neutronic reactor such as that described in detail in a paper, entitled "Description of the Pressurized Water Reactor (PWR) Completed Power Plant at Shippingport, Pa.," by J. W. Simpson et al., A/Conf. 8/P/815, published by the United Nations as part of the "Geneva Papers." More particularly, the aforesaid fuel element assembly is adapted for use in the neutronic reactor described in a paper, entitled "The Yankee Atomic Electric Plant," by Glen A. Reed, Robert J. Creagan, and Walter C. Woodman, presented at the A.S.M.E. annual meeting in New York City, November 26 to 30, 1956. The last-mentioned neutronic reactor is also described in a copending application of Robert J. Creagan, entitled "Neutronic Reactor," Serial No. 686,778, now abandoned, filed September 27, 1957, and assigned to the assignee of the present application. The over-all configuration of the fuel element assembly forming the subject of the present invention is substantially similar to that described in the aforementioned A.S.M.E. publication, with the exception that the fuel element assembly is provided with an improved and novel lateral and end joining means.

Referring now more particularly to the drawings, the illustrative form of the invention disclosed therein comprises an elongated cladding tube 20 fabricated, in the case of a pressurized water type heterogeneous reactor from a corrosion resistant material such as stainless steel. Zirconium or an alloy thereof or other structural material having a relatively low neutronic capture cross-section might also be utilized; however, the use of stainless steel is desirable in view of its relatively lower first cost and superior fabricational characteristics. A plurality of fuel pellets 22 are inserted within the cladding tube 20. The fuel pellets 22 desirably are right-cylindrical ceramic compacts which, for example, comprise uranium dioxide ($UO_2$). Initially, the ceramic pellets 22 form a continuous column as better shown in FIGURE 1 of the drawings extending substantially throughout the interior of the cladding tube 20.

At the bottom end 28 of the cladding tube 20 the column of pellets 22 rests upon the inward end of a plug member 30, a necked-down portion 32 of which is inserted into the end 28 of the cladding tube 20. A similar plug member 34 is inserted into the upper end 26 of the cladding tube 20, and each of the end plugs 30 and 34 are hermetically sealed to the adjacent end of the cladding tube 20 by means of annular sealing welds 36 and 38, respectively. In the fuel rod arrangement in accordance with the invention, however, provision of the aforementioned void employed in known fuel elements between the uppermost fuel pellet 22a and the inward end of the plug member 34 is not necessary. Thus, the upper surface of the fuel pellet 22a can rest against or be disposed very close to the inwardly extending necked-down portion 44 of the upper end plug 34. In this manner, the fuel pellets 22 are hermetically sealed within the cladding tube 20 in order to prevent the escape of fissional products therefrom into the reactor coolant stream. The outward ends of the plug members 30 and 34 desirably are tapered or chamfered as denoted by reference characters 40 to facilitate the flow of reactor coolant moving longitudinally of the fuel rods.

To aid in inserting the fuel pellets 22 into the cladding tube 20, before the upper end thereof is closed by the plug member 34, each of the fuel pellets 22 are furnished with a diameter less than the inner diameter of the cladding tube 20 so that a clearance denoted by reference character 42 initially is provided between the fuel pellets 22 and the adjacent inner wall of the cladding tube 20. In this arrangement, the fuel column is of the order of 100 inches in length initially and extends substantially the entire length of the cladding tube 20, inasmuch as the aforementioned void of known fuel rods is obviated by the invention.

When employed in the reactor described in the aforementioned Creagan application and in the A.S.M.E. publication, approximately 23,218 fuel rods are employed with assemblies of approximately 305 fuel rods and each are assembled in a square lattice array between stainless steel core plates as described in the aforementioned references. As indicated heretofore, the aforementioned fuel element assemblies, including a plurality of the fuel elements 18, can be fabricated in accordance with either of the aforementioned Frisch applications. Thus, a total of 76 fuel assemblies are utilized in the reactor core to provide a total active heat transfer area of about 17,300 square feet.

Each fuel rod 18 in this arrangement is 117 inches in over-all length with the combined lengths of the fuel pellets 22 totaling 102 inches. The reactor core loading then comprises 24,400 kilograms based on free column and having an approximate enrichment of 2.6% of the $U^{235}$ isotope. The reactor core then is designed for calculated reactivity life of 10,000 hours.

As described in the aforementioned A.S.M.E. document and copending applications, the fuel elements are supported within the assemblies (not shown) thereof on 0.425 inch centers, while the individual assemblies or bundles of fuel elements are spaced on 7.61 inch centers. The containing vessel (not shown) is generally cylindrical with an inside height and inside diameter of thirty feet and nine feet, respectively.

The reactor coolant is circulated through the vessel in a known manner and at the rate of 37,000,000 pounds per hour. With this arrangement a moderator-to-fuel ratio at standard conditions (S.T.P.), assuming a moderator-coolant of light water ($H_2O$), of 3.03 is attained.

A neutronic reflector is afforded by an annular space of 13 inches in radial thickness provided between the outer periphery of the reactor core and the inner wall surface of the reactor vessel and filled with the reactor moderator coolant material. This space communicates with the main coolant stream of the reactor vessel, as shown and described in the aforementioned Creagan application, to prevent boiling in the reflector area. This annular space includes the coolant channels between the thermal shields, which total 3 inches in thickness and which are described in the aforesaid Creagan application.

The thermal output of the aforementioned reactor, with the parameters outlined herein and in the aforementioned A.S.M.E. document and copending applications is approximately 480 megawatts which can be converted to about 135 megawatts of electricity with suitable, known thermodynamic machinery.

The initial height of the column of fuel pellets shown in FIGURE 1 in this example, then, is about 102 inches. However, the total active length of the fuel pellets in the finished fuel rod of the invention is approximately one inch longer as described hereinafter. In an exemplary arrangement of the invention the cladding tube 20 is supplied initially with an inside diameter of $0.3045\pm.001$ inch and a length of about 106 inches. The fuel pellets 22 on the other hand are machined such that the diameter of their cylindrical surfaces equals $.3000\pm.0005$ inch. The diameter of the necked-down portions 32 and 44 of the end plugs 30 and 34, respectively, are machined to fit relatively closely in the end portions of the cladding tube 20. The height or length of each fuel pellet 22 is of the order of 0.6 inch. With this arrangement, then, an initial diametric clearance 42 of .003 to .006 inch is afforded between the fuel pellets and the cladding tube 20. The initial assembly then of the fuel rod of the invention is similar to that of known arrangements with the exception that a void or space is not provided between the uppermost fuel pellet 22a and the inward end of the upper end plug 34.

Referring now to FIGURE 2 of the drawings, the final form of the fuel rod is shown therein. The fuel rod 18' of FIGURE 2 is formed by permanently elongating or stretching the fuel rod 18 of FIG. 1 in a direction parallel to its longitudinal axis. The stretching operation can be effected by suitable gripping means associated with the presently to be described stretching apparatus and engaged respectively with the end plugs 30 and 34. Or alternatively the cladding tube 20 of FIG. 1 can be furnished with temporary elongated end plugs (not shown) adapted for the stretching operation.

The stretching or elongation causes the cladding tube 20 to exceed its elastic limit, and the stretching operation is continued thereafter until the inner wall surfaces of the cladding tube 20' of FIG. 2 firmly grip each of the fuel pellets 22. The stretching operation desirably is carried out with the fuel element 18' in its horizontal position so that separating movement of the pellets 22 relative to one another will occur before the pellets are actually gripped by the walls of the cladding tube 20'. In this manner a maximum separation or space 46 is formed between adjacent pellets. However, in those cases wherein a lesser separation 46 is desired, the fuel rod 18 can be stretched in a vertical position with the result that the pellets 22 will remain in contact under the influence of gravity until the pellets are actually gripped by the wall of the cladding tube 20. An exemplary apparatus for stretching the fuel rod 18 as aforesaid, particularly in the horizontal position thereof, is disclosed in a copending application of R. K. McGeary and E. Frisch, entitled "Compartmented Reactor Fuel Element," Serial No. 723,421, filed March 17, 1958, now U.S. Patent No. 3,089,830, issued May 14, 1963, and assigned to the present assignee.

After the stretching operation, the clearance 42, which is provided initially between the pellets 22 and the cladding tube 20, as shown in FIG. 1, has disappeared, and those wall portions intermediate the ends 26' and 28' of the cladding tube 20' (FIG. 2) are reduced in diameter so that the inner surfaces of the aforesaid intermediate cladding tube portion is in contact with the cylindrical surfaces of the pellets 22. The arrangement, of course, increases greatly the rate of heat transfer from the pellets 22 to the outer surface of the cladding tube 20' where the heat is removed by a reactor coolant.

Moreover, the aforesaid stretching operation is continued until the length of the cladding tube 20' is increased by at least 4 percent relative to the cladding tube 20 of FIG. 1. With the dimensions noted heretofore it has been found that this amount of elongation in the cladding tube 20' is sufficient to cause the cladding tube 20' to grip each pellet 22 independently in order to maintain the spacings 46. The resultant contact between cladding tube 20' and fuel pellets 22 obviates the necessity of machining each pellet 22 in order to preserve the diametric clearances necessary in prior fuel rods. The stretching operation also produces, in this arrangement of the invention, necked-down portions 48 and 50 adjacent the ends 26' and 28' of the cladding tube 20', whereby the pellets 22a and 22b (FIG. 2) are gripped by the cladding tube 20' and moved during the stretching operation a short distance 52 from the end plugs 34 and 30, respectively.

As the cladding tube 20' is stretched further, a localized necking or reduction 54 and cladding tube diameter occurs at the separations 46 between adjacent fuel pellets 22. The localized reductions 54 and the engagement of the pellets 22 with the inner surface of the cladding tube 20' operates to maintain the pellets 22 in spaced relation during cyclic operation of the fuel rod 18; that is to say, at all times during heating and cooling thereof. Inasmuch as the cladding tube 20' is in physical contact with the pellets 22, the temperatures of the cladding tubes, during reactor operation is approximately equivalent to that of the adjacent cylindrical surfaces of the pellets. Therefore, the cladding tube 20' will expand in the longitudinal direction slightly more than the aforesaid cylindrical surfaces, due to its higher coefficient of expansion, assuming the cladding tube and the fuel pellets are fabricated from stainless steel and uranium oxide ($UO_2$), respectively. Therefore, the circular edges of the pellets will not be moved into gauging contact with the adjacent cladding tube reductions 54 by expansion of the pellets 22.

However, the pellets 22 will expand slightly more in the radial direction than will be the cladding tube 20' during reactor operation, since the central portions of the pellets are considerably hotter than the cylindrical surfaces thereof. Thus the cladding tube 20' always will remain in gripping contact with each of the pellets 22. Additionally, the aforesaid gripping contact will tend to prevent radial cracking of the fuel pellets to a much greater extent than if the pellets were free to expand into a diametric clearance space.

In this arrangement of the invention, it is contemplated that the sum total of the separations 46 and 52 will be equivalent to or slightly greater than the anticipated longitudinal differential expansion between the fuel pellet column and the cladding tube 20' during operation of the neutronic reactor in which the fuel rods 18' are utilized. Although the cylindrical surface of each pellet 22 will expand slightly less than the adjacent inner wall portion of the cladding tube 20' the central portions of the pellets 22 will expand longitudinally to a greater extent during reactor operation, for these central portions, of course, are then at a considerably higher temperature. By providing a space 46 between each pellet 22, no one point of the cladding tube 20' can be subjected to the combined expansion of a plurality of pellets 22. However, if the cladding tube 20' were not stretched to space the pellets 22, the accumulation of chips, particles, and other debris in the clearance 42 (FIG. 1) could prevent movement of these one or more pellets relative to the cladding tube 20 so that the wall of the cladding tube adjacent to these last-mentioned pellets would be subjected to the combined differential longitudinal expansion of all of the pellets 22 below the pellet which is bound or gripped by the aforesaid accumulation of debris. Moreover, bulging would occur at the aforesaid accumulation of debris inasmuch as the pellets 22 expand differentially in the radial direction relative to the cladding tube. In the stretched fuel rod of FIG. 2, however, there are no clearances between the pellets 22 and the cladding tube 20' to permit accumulation of debris, and any such accumulation would be contained within the spaces 46 and 52. Inasmuch as any such debris is limited to that resulting from only one or two fuel pellets and as the spaces or separations 46 and 52 are not in communication, a gross accumulation of debris cannot occur in the fuel element of FIG. 2.

Being free to expand both upwardly and downwardly, within the cladding tube 20', the pellets 22 will not therefore impart any longitudinal stresses to the cladding tube 20 as the fuel element 18' is heated. On the other hand, since the fuel pellets of known fuel rods are free to expand only in the upward direction relative to the cladding tube, it will be seen then that any localized gripping accidentally occurring during reactor operation would be directed toward the upward end of the fuel rod. Therefore, the degree of deformation which could be imparted to known types of fuel elements in the event that the aforesaid binding between the cladding tube and fuel pellets thereof should occur would be amplified or increased in accordance with the distance of the localized binding from the bottom of these fuel elements.

From the foregoing it will be apparent that a novel and efficient form of fuel element adapted for use in a neutronic reactor has been disclosed herein. Although the utility of the fuel rod has been described chiefly in connection with a pressurized water neutronic reactor, it will be appreciated that the fuel rod can be adapted to any type of heterogeneous reactor employing tubular fuel elements wherein a plurality of fuel pellets are inserted into a relatively closely fitting cladding tube.

Therefore, numerous modifications of the invention will occur to those skilled in this art without departing from the spirit and scope of the invention. For example, it is obvious that the cladding tube and the fuel pellets need not be circular in cross-section, but can take some other configuration, for example a plate type fuel element, as long as the cladding tube can be stretched or elongated to cause its inner wall surfaces to grip the fuel pellets independently.

Accordingly, what is claimed as new is:

1. A fuel element for a neutronic reactor, said element comprising a cladding tube, a plurality of pellets having fissionable material therein inserted within said tube, means for sealing each end of said cladding tube, said pellets being separated to provide spaces between adjacent pellets and between said sealing means and those pellets adjacent thereto, said spaces being at least equivalent to the amount of differential thermal expansion between said pellets and said cladding tube at the temperature of operation of said fuel element, the walls of said cladding tube gripping each of said fuel pellets independently, and the walls of said cladding tube in addition being necked-down at each of those spaces separating said fuel pellets to maintain said spaces, the necked-down portion of the walls of said cladding tube being transversely positioned with respect to the longitudinal axis of said fuel element.

2. A fuel element for a neutronic reactor, said element comprising a cladding tube, a plurality of $UO_2$ fuel pellets inserted within said cladding tube, a pair of end plugs secured and sealed to the ends respectively of said cladding tube, said fuel pellets being separated from one another and from said end plugs to form spaces between adjacent fuel pellets and between said end plugs and those pellets adjacent thereto, said spaces being at least equivalent to the amount of differential thermal expansion between said pellets and said cladding tube at the temperature of operation of said fuel element, the wall portion of said cladding tube intermediate said plug members being reduced to grip each of said fuel pellets to maintain said spaces, the reduced portion of the wall of said cladding tube being transversely positioned with respect to the longitudinal axis of said fuel element.

References Cited in the file of this patent

UNITED STATES PATENTS

| | | |
|---|---|---|
| 2,838,452 | West et al. | June 10, 1958 |
| 2,852,460 | Abbott et al. | Sept. 16, 1958 |
| 2,853,446 | Abbott et al. | Sept. 23, 1958 |
| 2,874,459 | Haldeman | Feb. 24, 1959 |
| 2,890,158 | Ohlinger et al. | June 9, 1959 |